United States Patent [19]

Huber

[11] Patent Number: 4,487,270
[45] Date of Patent: Dec. 11, 1984

[54] ELECTRIC TOOL, PARTICULARLY A HANDTOOL, WITH TORQUE CONTROL

[75] Inventor: Siefried Huber, Johannesberg, Fed. Rep. of Germany

[73] Assignee: Black & Decker Inc., Newark, Del.

[21] Appl. No.: 444,032

[22] Filed: Nov. 23, 1982

[30] Foreign Application Priority Data

Nov. 24, 1981 [DE] Fed. Rep. of Germany ....... 3146494

[51] Int. Cl.³ ............................................. B25B 23/14
[52] U.S. Cl. .................................... 173/12; 73/862.31; 73/862.49; 74/412 TA; 81/469; 338/99; 338/103; 338/110; 408/9
[58] Field of Search ................... 173/2, 11, 12, 15, 16; 310/47, 50, 68 B; 73/862.31, 862.29, 862.49; 318/488, 481, 357, 358, 349; 81/469; 338/99, 103, 110, 112, 114; 83/58, 62; 408/9, 11; 74/412 TA

[56] References Cited

U.S. PATENT DOCUMENTS

| 2,274,926 | 3/1942 | Kimmick | 338/99 |
| 2,281,871 | 5/1942 | Corby, Jr. | 73/862.49 |
| 3,286,776 | 11/1966 | Richison et al. | 173/48 |
| 3,386,067 | 5/1968 | Costanzo | 338/114 |
| 3,463,990 | 8/1969 | Ross | 338/99 |
| 3,834,467 | 9/1974 | Fuchs | 173/12 |
| 4,089,216 | 5/1978 | Elias | 73/862.31 |
| 4,188,821 | 2/1980 | Elias | 73/862.31 |
| 4,252,391 | 2/1981 | Sado | 338/114 |

FOREIGN PATENT DOCUMENTS 2045385 7/1975 Fed. Rep. of Germany .
2442260 3/1976 Fed. Rep. of Germany .
2543455 8/1976 Fed. Rep. of Germany .

Primary Examiner—Frank T. Yost
Assistant Examiner—Hien H. Phan
Attorney, Agent, or Firm—Harold Weinstein; Edward D. Murphy; Ronald B. Sherer

[57] ABSTRACT

A power tool has an electric motor with a motor shaft having a spiral gear through which the motor drives the tool. A pressure sensor is disposed so as to be subjected to the axial thrust of the motor shaft created by the spiral gear during operation of the tool. A torque control device is connected to the pressure sensor for influencing the motor in response to such axial thrust, for example to control or limit the torque of the motor. Preferably, the pressure sensor comprises a disk of electrically conductive plastic and is located between a thrust bearing of the motor shaft and an axial support therefor. Such disk is disposed between a pressure plate and an electrode plate having spaced apart electrodes.

10 Claims, 5 Drawing Figures

ELECTRIC TOOL, PARTICULARLY A HANDTOOL, WITH TORQUE CONTROL

FIELD OF THE INVENTION

The invention relates to electric tools, particularly a handtool with torque control that employs a measuring element for influencing the electric motor of the tool.

BACKGROUND OF THE INVENTION

To control, or if necessary limit, the torque of the tool and at the same time eliminate the danger of accidents, given the ever increasing power and torque of such tools, it has been proposed in German Offenlegungsschrift No. 24 42 260 that the deformation of the handle across from the housing be measured and regulated as a function of the output of the driving motor. To measure the torque of the motor, wire strain gauges or piezoresistors are employed, which are preferably placed in an area of the tool with a reduced housing cross section.

The measurement of the housing stress in the area of the handle has the disadvantage that for every different housing construction laborious adjustment of the transducer, including the wiring, is required. Further, there is a danger that the control will not function correctly if in particular circumstances, or out of negligence, the tool is not held by the handle or if attachments to the tool reduce or prevent the handle being stressed in relation to the torque of the motor.

SUMMARY OF THE INVENTION

The object of the present invention is to provide an electric tool with a simple, reliable, and sensitive torque control, which is universally adaptable. A feature by which this is obtained is the employment of spiral gearing or a spiral on the power take-off side of the shaft of the electric motor together with the provision of a pressure sensor as a measuring element for the axial thrust of the motor shaft.

This torque measurement is based on the recognition that the intrinsically rather disadvantageous axial thrust requiring a thrust bearing with spiral gearing or a spiral on the motor shaft, which gearing is usually chosen for reasons of quiet running and better load transfer, can be used for measuring torque. Since this torque measurement is taken directly at the driving motor, it has the advantage that it can be applied in tools of different form and type, such as in electric hand drills, screwdrivers, handsaws, etc. without modification for the type of tool housing etc. Only the torque is measured, based on actual mechanical performance, and not also the reaction based on the inertia at starting or electrically stopping the motor.

Accordingly, therefore, there is provided by the present invention a power tool comprising an electric motor having a motor shaft, the motor shaft having a spiral gear through which the motor drives the tool, a pressure sensor disposed so as to be subjected to the axial thrust of the motor shaft created by the spiral gear during operation of the tool, and torque control means connected to the pressure sensor for influencing the motor in response to said axial thrust.

With the aid of an evaluating switch of a known type, the signal emitted by the pressure sensor can be used for limiting the torque to a preselected amount, and thus provide for a desired torque for tightening screws, or an overload protection, or a power output limit as required for the particular tool. Moreover, the torque of the motor may be visably indicated; or the torque may be used for setting certain events in motion, such as the automatic shifting of gears, should predetermined thresholds be exceeded.

The pressure sensor may be placed between the electric motor and its axial support in the tool housing, or may be placed inside the motor, namely between the main motor shaft bearing across from the spiral gearing or spiral and the axial support for this bearing. This location is relatively far from the parts of the motor that are under high stress and thus get hot while the motor is operating. If necessary, a heat transfer element or thermal insulation can be additionally provided for protecting the pressure sensor from such generated heat.

The pressure sensor can be any device that converts a mechanical force into an electrical signal. These include, for example, piezoelectrical converters. Preferably, however, the pressure sensor comprises electrically conductive plastic, whose resistance changes as a function of the pressure exerted upon it. Such a plastic, which is also called "conductive plastic", is known in many forms. For instance, silicon rubber mixed with metal particles or coal dust can be used as disclosed in German Auslegeschrift No. 25 43 455. Also known is the use of such a material as a pressure sensitive switch for overload safety, see German Pat. No. 20 45 385, and as a constantly changeable resistor for regulating electric current consumption for speed control of hand drills, see U.S. Pat. No. 3,386,067. The signals supplied from such pressure sensors are relatively high because the electric resistance of the conductive plastic changes relatively sharply with the pressure, for example by several powers of ten. Therefore the evaluating switch can be simple and reliable. The pressure sensors themselves, however, are non-sensitive, reliable, and highly durable. Thus they are suitable for the rough operation of electric tools.

Preferably, the conductive plastic is in the form of a small disk, which is sandwiched between a pressure plate and an electrode plate equipped with electrodes arranged at a distance from each other. Preferably, the small disk, the electrode plate, and the pressure plate are ring-shaped with approximately the same inside and outside diameters, respectively, and are placed behind a ball bearing on the end of the motor shaft away from the spiral gearing or spiral, whereby the inner and outer diameters coincide with the corresponding dimensions of the ball bearing.

Because a pressure sensor in kinematic reversal can respond to pulling as well as pushing, such devices can also be used that measure a force based on a displacement against a resistance, for example, in the form of a change in distance, which can be measured with an inductive proximity detector or a Hall effect sensor.

Other objects, features and advantages of the present invention will become more fully apparent from the following detailed description of the preferred embodiment, the appended claims and the accompanying drawing.

DETAILED DESCRIPTION OF THE PREFERRED EMBODIMENT

Figure 1:
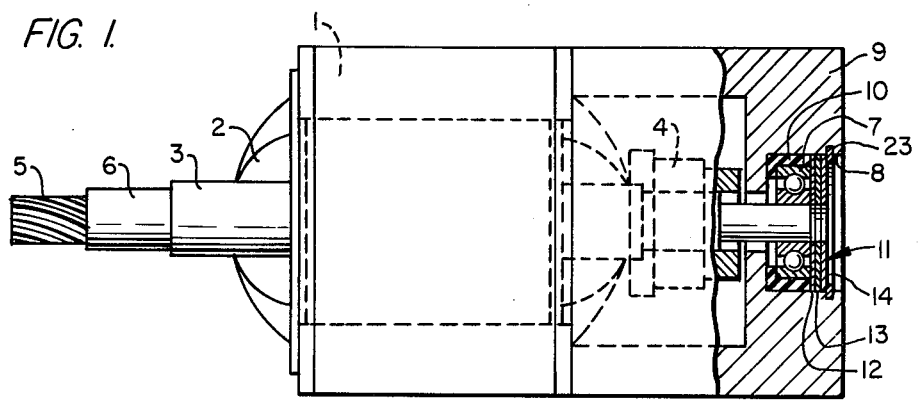
FIG. 1 shows a side view, partially in cross-section, of an electric motor for an electric tool with a pressure sensor for torque control according to the invention.
Figure 3:
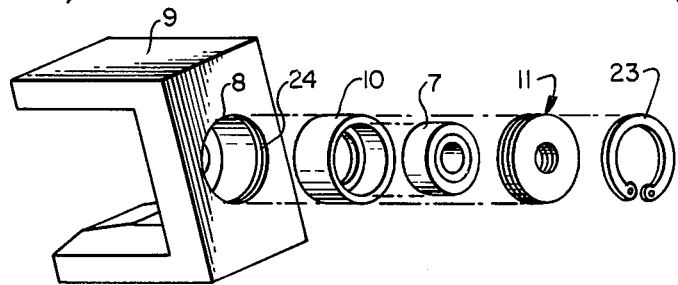
FIG. 3 is an exploded illustration of the arrangement of the pressure sensor in the motor of FIG. 1.

FIG. 1 shows an electric motor of a hand drill or similar portable electric tool. It has a stator 1 surrounding a rotor 2. The shaft 3 of the rotor 2 has a standard armature winding, which is not shown in detail, and a commutator 4 (for simplicity, the brushes and brush gear are not shown), and has a spiral gear 5 on the power take-off side. The spiral gear 5 meshes in the electric tool with a corresponding spiral toothed gear wheel 21 (see FIG. 5). On the side of the spiral gear 5, the shaft 3 has a journal 6, which together with a bearing shell (not shown) forms a sliding bearing in the tool housing, or can also accommodate a ball bearing 22 (see FIG. 5). At the opposite end of the shaft 3, a ball bearing 7 is pressed on the shaft 3. The bearing 7 is located in a bore 8 of a bridge or yoke 9 which is mounted on the stator 1. As can be seen, the bore 8 has a shoulder at its inner end. To reduce noise, a rubber ring 10, which resiliently supports the outer race of the ball bearing 7, is inserted in the bore hole 8. As can be seen in FIGS. 1 and 3, the rubber ring 10 is an annular sleeve with a radially inwardly projecting flange at its inner end.

When shaft 3 transmits torque through the spiral gear 5, because of the spiral gearing, an axial thrust occurs whose direction depends on the direction of rotation and whose magnitude depends on the transmitted torque. This axial thrust functions, if a certain direction of rotation is assumed, as a pressure force on a pressure sensor 11 disposed behind the ball bearing 7 in the bore 8. The pressure sensor 11 is located in physical contact with the outside of the bearing 7, and the force transfer occurs via the ball bearing 7.

FIG. 3 shows, in an exploded view, the arrangement of the individual structural components in the bore 8. In the bottom, i.e. at the inner end, of the bore 8 is the rubber ring 10 in which is located the ball bearing 7. Then follows the pressure sensor 11 which rests against bearing 7. The rubber ring 10, bearing 7 and sensor 11 after insertion in the bore 8 are firmly held in place therein by means of a snap ring 23 which penetrates into an annular groove 24 in the wall of bore hole 8. By means of this fastening arrangement, the snap ring 23 also absorbs the axial forces transmitted by the shaft 3.

Figure 2:
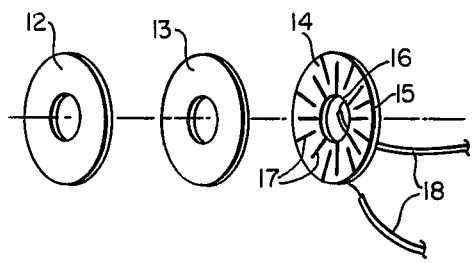
FIG. 2 shows an exploded view of the pressure sensor of the motor of FIG. 1.

FIG. 2 shows the pressure sensor 11 having a pressure plate 12, consisting of electrically insulating material, which is directly juxtaposed the ball bearing 7. After the pressure plate 12, there is a ring-shaped small disk 13 made out of a pressure dependent conductive plastic, and adjacent the latter is an annular electrode plate 14 having conductive outer and inner rings 15 and 16, respectively. From these rings 15, 16 extend radially electrodes 17, which are interleaved with each other like a comb. The electrodes 17 extending inwardly from the ring 15 do not touch the electrodes 17 extending outwardly from the inner ring 16, the two sets of electrodes 17 being electrically connected through the conductive plastic disk 13 which functions as a pressure-dependent resistor. Electrical leads 18 are connected to the inner and outer rings 16, 15.

Figure 4:
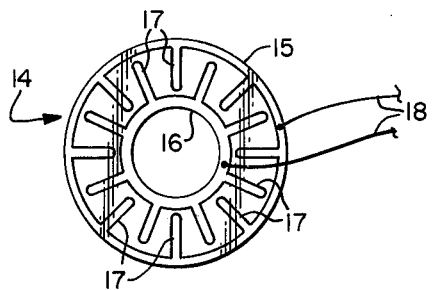
FIG. 4 is a plan view, on a larger scale, of the electrode plate of the pressure sensor of FIG. 2.

FIG. 4 shows a view of the electrode plate 14 in the direction of the rotational axis of the motor. It is made similarly to a printed circuit board, in other words, it is made from a layer or sheet of insulation material with a copper coating laminated on one side, which coating is selectively etched in known manner so that the outer ring 15, the inner ring 16, and the comb-like electrodes 17 will be obtained.

In operation a resistance occurs between the leads 18, connected to the outer and inner rings 15, 16, that depends on the axial thrust of motor shaft 3 and thus on the torque it produces. This resistance is used for influencing the electric motor 1, particularly for the regulation or limitation of the torque thereof, through appropriate torque control means, such as a known type evaluating switch.

Figure 5:
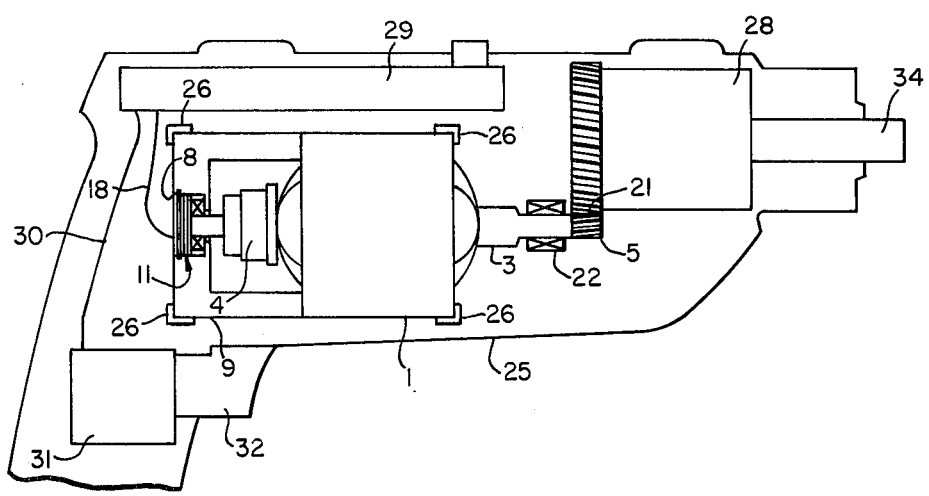
FIG. 5 is a diagrammatic side view of a portable electric drill according to the invention employing the motor of FIG. 1, half of the tool's housing having been removed and some parts shown schematically.

FIG. 5 shows the electric motor of FIGS. 1 to 4 mounted in a handheld electric drill. It will be noted that the motor 1 has been turned around lengthwise through 180 degrees from its position in FIG. 1. The motor 1 is supported and retained in the tool's housing 25 by means of molded bearing parts 26. The shaft 3 of the motor rotates at the forward end in the ball bearing 22, and the spiral gear 5 meshes with a larger, spirally toothed gear 21. The gear 21 is a part of the customary gearing arrangement of the electric drill, the rest of such gearing arrangement being shown schematically by the box 28. Through the gearing arrangement 28 is driven a spindle 34 upon which is mounted a chuck (not shown) for holding drill bits. From pressure sensor 11, arranged in the bore hole 8 of the bridge 9, the electrical leads 18 (only one of which is shown in FIG. 5) run to a control circuit 29 which contains the analysis circuit for the signals given by the pressure sensor 11. The control circuit 29 also has a connection 30 to the main switch 31 of the drill, the switch 31 being activated by the usual trigger 32.

In general, pressure sensors can be used that react to push as well as pull and thus are effective in both directions of rotation of the motor. For this, separate sensors or sensors that react to forces in opposite directions can be used. In the shown example, however, only the force in one direction of rotation of the motor is measured. This is desirable, for example, if for a screwdriver the torque for tightening screws is limited, but for the unscrewing process the maximal torque should always be available.

If with higher demands, temperature or other influences on the pressure sensor need to be avoided, it is possible to connect together four symmetrically arranged pressure sensors in a bridge circuit, one diagonal of which is supplied with input voltage and the other diagonal of which emits the signal to be evaluated. The four symmetrically arranged pressure sensors, for example, can be formed by subdividing the outside ring 15 and the inside ring 16 of the electrode plate 14 (FIG. 4) with the comb-like electrodes 17 into four quadrants which are insulated from each other, each such quadrant, together with a likewise separated quadrant of pressure plate 13, forming a separate pressure sensor.

It will be appreciated that the spiral gear 5 can be integrally formed on the motor shaft 3, as illustrated, or can be in the form of a separate gear mounted on the shaft 3. The form of the spiral gearing is preferably helical.

The above described embodiments, of course, are not to be construed as limiting the breadth of the present invention. Modifications, and other alternative constructions, will be apparent which are within the spirit and scope of the invention as defined in the appended claims.

What is claimed is:

1. A power tool, comprising:
   an electric motor having a motor shaft;
   said motor shaft having a spiral gear through which said motor drives the tool;
   a pressure sensor disposed so as to be subjected to the axial thrust of said motor shaft created by said spiral gear during operation of the tool;
   torque control means connected to said pressure sensor for influencing said motor in response to said axial thrust; and
   said pressure sensor comprising electrically conductive plastic disposed between a pressure plate of electrically insulating material and an electrode plate having spaced apart electrodes, the electrical resistance of said conductive plastic changing as a function of the pressure exerted thereupon.

2. The power tool of claim 1, wherein said pressure sensor is located between said motor shaft and means for axially supporting the motor shaft in the power tool.

3. The power tool of claim 1, wherein said spiral gear is located at one end of the motor shaft, and the other end of the motor shaft is mounted in a bearing, said pressure sensor being located between said bearing and an axial support therefor.

4. A power tool, comprising:
   an electric motor having a motor shaft;
   said motor shaft having a spiral gear through which said motor drives the tool;
   a pressure sensor disposed so as to be subjected to the axial thrust of said motor shaft created by said spiral gear during operation of the tool;
   torque control means connected to said pressure sensor for influencing said motor in response to said axial thrust;
   said spiral gear being located at one end of the motor shaft, and the other end of the motor shaft being mounted in a bearing, said pressure sensor being located between said bearing and an axial support therefor;
   said pressure sensor comprising electrically conductive plastic the electrical resistance of which changes as a function of the pressure exerted thereupon; and
   said conductive plastic being in the form of a disk disposed between a pressure plate and an electrode plate, said electrode plate having spaced apart electrodes.

5. The power tool of claim 4, wherein said disk, said pressure plate, and said electrode plate are annular and are juxtaposed said bearing.

6. The power tool of claim 5, wherein said electrode plate is a printed circuit board having an inner conductive ring with outwardly extending radial electrodes and an outer conductive ring with inwardly extending radial electrodes, the inwardly and outwardly extending electrodes being interleaved in spaced apart relationship.

7. The power tool of claim 5, wherein said bearing is mounted in a bore in a bearing support member, and said pressure sensor is located in said bore in contact with said bearing.

8. The power tool of claim 7, wherein said bearing is a ball bearing and is mounted in a resilient ring, said resilient ring being mounted in said bore.

9. A portable power tool, comprising:
   a housing;
   an electric motor having a motor shaft extending form opposite ends thereof, said motor being mounted in said housing;
   said motor shaft having spiral gearing at one end and being mounted in a thrust bearing at the other end;
   means, located in said housing, for supporting said bearing against axial thrust;
   a pressure sensor comprising electrically conductive plastic the electrical resistance of which changes as a function of the pressure exerted thereon, said pressure sensor being disposed axially between said bearing and said supporting means;
   torque control means for influencing said motor responsive to the axial thrust created by said spiral gearing and exerted by said bearing upon said pressure sensor; and
   a rubber ring mounted in a bore in said supporting means and resiliently supporting said bearing therewithin, said ring having a radially inwardly projecting flange engaging said bearing on the opposite axial side thereof to said pressure sensor.

10. An electric hand tool, comprising:
    a housing;
    an electric motor having a motor shaft extending from opposite ends thereof and having a stator;
    a spiral gear at one end of said motor shaft meshing with another spiral gear through which gearing said motor drives the tool;
    a bearing in which the other end of said shaft is mounted;
    a yoke mounted on said stator, said yoke having a bore therein in which is mounted said bearing;
    a snap ring engaged in a groove in said bore for supporting said bearing against axial thrust imparted to said bearing through said motor shaft by said spiral gearing during operation of the tool;
    a pressure sensor disposed in said bore between said bearing and said snap ring and being subjected to said axial thrust;
    said pressure sensor comprising an annular pressure plate, an annular electrode plate, and a ring-shaped disk of electrically conductive plastic therebetween, the resistance of said conductive plastic changing as a function of the pressure exerted thereon;
    said electrode plate having outer and inner conductive rings from which extend radially electrodes, the electrodes of the outer ring being interleaved between the electrodes of the inner ring;
    means supporting said motor and said yoke in said housing; and
    means for influencing the torque of said motor in response to the axial thrust exerted by said bearing upon said pressure sensor.

* * * * *